United States Patent
Puri

(10) Patent No.: US 11,037,195 B1
(45) Date of Patent: Jun. 15, 2021

(54) METHOD AND SYSTEM FOR INTELLIGENTLY TARGETING OFFERS TO USERS OF A SOFTWARE APPLICATION

(71) Applicant: INTUIT INC., Mountain View, CA (US)

(72) Inventor: Gaurav Puri, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 289 days.

(21) Appl. No.: 15/985,361

(22) Filed: May 21, 2018

(51) Int. Cl.
G06Q 30/02 (2012.01)

(52) U.S. Cl.
CPC ..... G06Q 30/0255 (2013.01); G06Q 30/0254 (2013.01); G06Q 30/0269 (2013.01)

(58) Field of Classification Search
CPC .......... G06Q 30/0255; G06Q 30/0254; G06Q 30/0269
See application file for complete search history.

(56) References Cited

U.S. PATENT DOCUMENTS

| | | | | |
|---|---|---|---|---|
| 7,953,663 B1* | 5/2011 | LeKachman | ........ | G06Q 20/108 705/35 |
| 7,970,672 B2* | 6/2011 | Mendelovich | ......... | G06Q 30/02 705/35 |
| 8,412,604 B1* | 4/2013 | Graham | ............. | G06Q 30/0204 705/35 |
| 2007/0271194 A1* | 11/2007 | Walker | ................. | G06Q 50/188 705/80 |
| 2008/0208548 A1* | 8/2008 | Metzger | ................. | G06Q 30/02 703/6 |
| 2010/0076895 A1* | 3/2010 | Spencer | ............. | G06Q 10/0637 705/80 |
| 2010/0106568 A1* | 4/2010 | Grimes | .............. | G06Q 30/0254 705/14.1 |
| 2013/0054334 A1* | 2/2013 | Ross | .................. | G06Q 30/0225 705/14.25 |
| 2014/0074615 A1* | 3/2014 | Hope | ................. | G06Q 30/0267 705/14.64 |

(Continued)

OTHER PUBLICATIONS

"Facebook Partner Category Targeting & Retargeting & Action Spec Targeting, Oh My" (DOM Team, May 28, 2013 published on http://directom.com/facebook-targeting/) (Year: 2013).*

*Primary Examiner* — James M Detweiler
(74) *Attorney, Agent, or Firm* — Patterson + Sheridan, LLP

(57) ABSTRACT

Aspects of the present disclosure provide techniques for intelligently presenting targeted offers to a user of a software application. Embodiments include receiving received request from a user of the software application to access a portion of the software application. Using a predictive model, a predictive score is generated for the user. The predictive model generally may be a model trained using user account data reduced into n-tuples of predictive attributes representative of a plurality of users, correlated with clickstream data associated with the plurality of users indicating whether a user interacted with a targeted offer. The predictive score generally represents a likelihood that the user will interact with the targeted offer based on data stored by the software application for the user. The targeted offer is presented to the user based, at least in part, on a determination that the predictive score for the user exceeds a threshold score.

20 Claims, 5 Drawing Sheets

(56) References Cited

U.S. PATENT DOCUMENTS

| | | | |
|---|---|---|---|
| 2018/0025378 A1* | 1/2018 | Sinha | G06Q 30/0264 |
| | | | 705/14.43 |
| 2018/0032997 A1* | 2/2018 | Gordon | G06Q 30/0269 |
| 2018/0114139 A1* | 4/2018 | Kucera | G06Q 30/0269 |

* cited by examiner

| UserID | AccountActivatedDate | ExternalAccessPermissions |
|---|---|---|
| 1234 | 1/3/2017 | {1235, 1236, 1238} |

| TransactionID | Amount | Balance |
|---|---|---|
| 1234_01 | -$523.12 | -$123.01 |
| 1234_02 | $1,000.00 | $876.99 |
| 1234_03 | -$277.00 | $598.99 |
| 1234_04 | -$625.95 | -$26.96 |
| 1234_05 | $1,275.83 | $1,248.87 |

USER ACCOUNT DATA 410

| OfferID | UserID | ClickedOnAd |
|---|---|---|
| 101 | 1234 | N |
| 102 | 1234 | Y |
| 103 | 1234 | Y |

CLICKSTREAM DATA 420

{ 490, 1, 2, 0 } → 0.67

USER N-TUPLE 430

FIG. 4

METHOD AND SYSTEM FOR INTELLIGENTLY TARGETING OFFERS TO USERS OF A SOFTWARE APPLICATION

INTRODUCTION

Aspects of the present disclosure generally relate to using predictive modeling to present targeted messages to users of a software application. In particular, embodiments of the present disclosure involve presenting targeted messages to users of a software application using a prediction engine trained with data from other users of the software application.

BACKGROUND

Software applications are generally deployed for use by many users for the performance of a specific function. These applications may be deployed as web applications accessible over the Internet or a private network or as desktop applications including static components executed from a local device and dynamic components executed from content retrieved from a network location. These applications can include financial applications, such as tax preparation applications, accounting applications, personal or business financial management applications, or the like; social media applications; other electronic communications applications; and so on.

Some applications may include components that allow advertisements for goods or services to be presented to a user while the user is interacting with the application (e.g., in an interstitial page between different components of a web application, in a dedicated advertising panel in an application, in electronic communications sent to the user after a user begins interacting with the application, etc.). These advertisements may be textual advertisements that require a minimal amount of overhead to add to network communications between a client device and an application. However, some advertisements may include audio and/or visual components which may impose more overhead for transmitting the advertisement to a client device.

In some cases, the advertisements presented to a user may be randomly selected by an advertisement placement engine. These advertisements, however, may be for goods or services that are not relevant to the user. Even where an advertisement may be relevant to a user, the user may not actually quality for the advertised offer. In either case, i.e., delivering advertisements to a user that are not relevant to the user or advertisements for offers that a user is not qualified for, resources (e.g., network bandwidth, user data caps, etc.) are wasted, which that could be used for other productive purposes.

Thus, what is needed are techniques for placing advertisements, or targeted offers, that are relevant to the user of a software application and that the user is likely to qualify for.

BRIEF SUMMARY

Certain embodiments provide a computer-implemented method for presenting a targeted offer to a user of a software application. The method generally includes receiving a request from a user of the software application to access a portion of the software application. Using a predictive model, a predictive score is generated for the user. The predictive model generally comprises a model trained using user account data reduced into n-tuples representative of a plurality of users and clickstream data. The n-tuples generally include a plurality of identified predictive attributes from the user account data for each user of the plurality of users, and the n-tuples generated for each user of the plurality of users are generally correlated with clickstream data associated with that user indicating whether that user interacted with the targeted offer. The predictive score generally represents a likelihood that the user will interact with the targeted offer based on data stored by the software application for the user. The targeted offer is presented to the user based, at least in part, on a determination that the predictive score for the user exceeds a threshold score.

Other embodiments provide a system comprising a processor and a non-transitory computer-readable medium storing instructions that, when executed by the processor, cause the processor to perform an operation for presenting a targeted offer to a user of a software application. The operation generally includes receiving a request from a user of the software application to access a portion of the software application. Using a predictive model, a predictive score is generated for the user The predictive model generally comprises a model trained using user account data reduced into n-tuples representative of a plurality of users and clickstream data. The n-tuples generally include a plurality of identified predictive attributes from the user account data for each user of the plurality of users, and the n-tuples generated for each user of the plurality of users are generally correlated with clickstream data associated with that user indicating whether that user interacted with the targeted offer. The predictive score generally represents a likelihood that the user will interact with the targeted offer based on data stored by the software application for the user. The targeted offer is presented to the user based, at least in part, on a determination that the predictive score for the user exceeds a threshold score.

Still further embodiments provide a system for presenting a targeted offer to a user of a software application. The system generally includes a predictive model training engine and a targeted offer placement engine. The predictive model training engine is configured to receive at least user account data and clickstream data associated with a targeted offer for a plurality of users of the software application and train a predictive model using the user account data and clickstream data. The predictive model is trained by identifying a plurality of predictive attributes from the user account data associated with each user of the plurality of users, generating an n-tuple representative of each user of the plurality of users including each of the plurality of predictive attributes, and correlating the n-tuple generated for each user of the plurality of users with clickstream data associated with that user, wherein the clickstream data indicates whether that user interacted with the targeted offer. The targeted offer placement engine is generally configured to receive a request from a user of the software application to access a portion of the software application. Using the predictive model, the targeted offer placement engine generates a predictive score for the user. The predictive score generally represents a likelihood that the user will interact with the targeted offer based on data stored by the software application for the user. The targeted offer placement engine presents the targeted offer to the user based, at least in part, on a determination that the predictive score for the user exceeds a threshold score.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates an example transformation of user data into an n-tuple representative of the user used to train a predictive model and obtain a predictive score for a user, according to an embodiment of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for intelligently targeting offers to users of a software application.

Embodiments of the present disclosure relate to the presentation of targeted messages in a software application using, in part, predictive models and scoring to determine whether to present a targeted offer to a user of the software application. User data for a specific user of the software application can be reduced to an n-tuple, or feature vector, representing data points about the user that are relevant to determining whether that specific user is likely to interact with the targeted offer (e.g., click on an advertisement presented to the user in a portion of the software application). A threshold score can be established for determining whether to present the targeted offer to the user of the software application when a user requests access to a portion of the software application. If the predictive score calculated for the user exceeds the defined threshold score, the targeted offer may be presented to the user. Otherwise, the user may proceed to a requested portion of the software application without the targeted offer being presented to the user. By presenting targeted offers to users who are likely to interact with the targeted offer and bypassing presentation of the targeted offers to users who are unlikely to interact with the targeted offer, embodiments of the present disclosure improve the user experience of a software application by presenting targeted offers only to users who are likely to be interested in the targeted offer. Further, by presenting targeted offers only to users who are likely to interact with the targeted offer, embodiments of the present disclosure may reduce the amount of bandwidth used in delivering application content to users of the software application.

As described in further detail herein, a predictive model is generated based on a training data set generated from user data in the software application and clickstream data for other users of the software application. In some embodiments, to minimize the amount of extraneous data in a training data set, the training data set may include data from a subset of users of the software application. This subset of users may be defined as users matching some set of predetermined criteria defining users who are likely to qualify for the targeted offer. Each n-tuple representative of a user of the software application may be associated with clickstream data for that user indicating whether the user has previously interacted with similar targeted offers. The predictive model is trained using the correlations between a user data n-tuple and user clickstream data, and the predictive model is deployed to an application server for use in determining whether users of the software application should receive future targeted offers.

Example Embodiment

Figure 1:
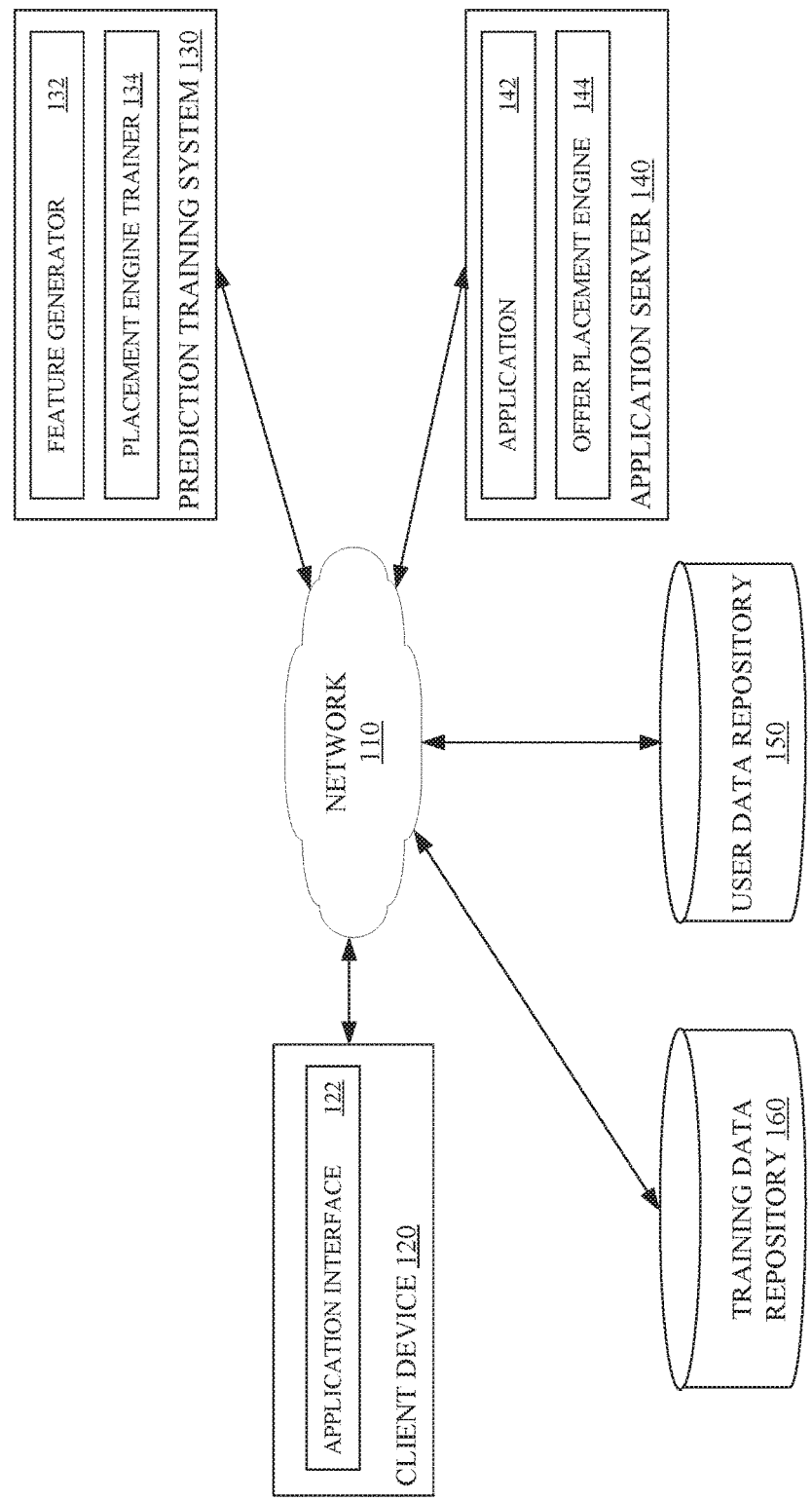
FIG. 1 illustrates an example networked environment in which targeted offers are intelligently delivered to users of a software application, according to an embodiment of the present disclosure.

FIG. 1 illustrates an example networked environment 100 in which predictive models are trained and deployed for determining whether to present a targeted offer to a user of a software application. As illustrated, networked environment 100 includes a client device 120, prediction training system 130, application server 140, user data repository 150, and training data repository 160, communicatively connected via network 110.

Client device 120 is illustrative of a variety of connected devices that may be used by a user to access application 142 on application server 140. Client device 120 may be, for example, a desktop computer, a laptop computer, a tablet device, a mobile phone, or other computing device with networked communications capabilities. As illustrated, client device 120 includes an application interface 122. Application interface 122 generally receives application content and, if applicable, targeted offers, from application server 140 for display on client device 120. Application interface 122 further provides an interface for a user of the software application to interact with application 142 and targeted offers presented therein.

Prediction training system 130 generally uses user data from application 142 and historical user interaction data (e.g., clickstream data, or data identifying whether a user clicked on a specific portion of an interactive element presented to a user) associated with targeted offers previously presented to users of application 142 to generate a predictive model. This predictive model is used by offer placement engine 144 to determine whether to present a targeted offer to a user of application 142. As illustrated, prediction training system 130 includes a feature generator 132 and a placement engine trainer 134.

Feature generator 132 generally obtains user data from user data repository 150 for a plurality of users of application 142 and reduces, for each respective user, the respective user data to a representative n-tuple, or feature vector, that can be used to train offer placement engine 144. The n-tuple and clickstream data for a particular user may be saved in training data repository 160 for use by placement engine trainer 134 to train offer placement engine 144. While the below discussion describes the generation of n-tuples using illustrative examples of user data in an accounting system, it should be recognized that the techniques described herein may be applicable in a variety of other computing systems and are not limited by the illustrative examples described herein.

In an accounting application, user data that can be reduced into a representative n-tuple for a specific user corresponds to one or more predictive attributes associated with the targeted offer. These predictive attributes may include, without limitation, user transaction history, the age of the user account, information about whether the user has previously obtained products similar to that of the targeted offer, whether the user has granted access to the user data to other users (e.g., to outside service providers), and so on. To generate the representative n-tuple, feature generator 132 analyzes the data to reduce the user data into single data points for each of the predictive attributes to be included in the n-tuple. These predictive attributes may be a number of occurrences (or non-occurrences) of an event, Boolean values indicating whether or not a condition is true for a specific user, or other data points that are relevant to identifying users who should receive a targeted offer. For example, where a placement engine is used to present targeted offers for a lending product to qualified users who may be interested in obtaining a lending product, the representative n-tuple may include, without limitation, data points identifying a number of specific events in the user transaction history (e.g., overdrafts, bank fees, etc.), an age of a user account, a Boolean value indicating whether a user has previously obtained similar products, and a Boolean value indicating whether the user has granted access to the user's data to outside service providers.

To identify a number of specific events in a user account, feature generator 132 can obtain user transactional history data from user data repository 150 for a specified time period. This time period may cover the entire history of the user account or a subset of the time period in which the user account has been active. For example, for users who are known to have interacted with a targeted offer, the time period may cover a fixed amount of time prior to interaction with the targeted offer. For each transaction in the transactional data returned from user data repository 150, feature generator 132 can parse one or more of a transaction date, a transaction description, a transaction amount, and an ending balance to identify specific events in the user's transactional history.

In some embodiments, a negative ending balance associated with a transaction may be identified as a negative event. In response to detecting that a transaction is associated with a negative ending balance, feature generator 132 increments a counter of negative events for the user. Other types of negative events, however, may be more difficult to identify based solely on the ending balance information associated with a particular transaction. To identify other negative events that may not culminate in a negative ending balance, feature generator 132 can examine transaction date, transaction descriptions and transaction amounts to determine if a transaction itself represents a negative event for the user.

For example, consider a scenario in which a flat fee is levied on a user's checking account if the user does not maintain a minimum balance. A fee transaction may thus occur in the user's transactional history on a regular basis, with a particular transaction description and a particular amount. Based on information known a priori to feature generator 132 (e.g., account statement closing dates, transaction descriptors, and account fees), feature generator 132 can identify these transactions as negative events based on matching 3-tuples of {transaction date, transaction descriptor, transaction amount} and increment a counter of negative events in response to such an identification.

In some embodiments, feature generator 132 can determine whether a specific user has obtained similar products to that advertised in the targeted offer by examining user transactional data. For example, where the targeted offer is an offer for a lending product, feature generator 132 can examine user transactional data for transaction entries showing a disbursement of funds from another lender or a repayment (whether repayment is periodic or a one-time event) to another lender. In some cases, it can be assumed that a disbursement of funds from another lender may be for an amount that exceeds, by some threshold amount, the average transaction value in the user's transactional history, and correspondingly, if the amount is repaid as a one-time event, that the repayment also exceeds the average transaction value in the user's transactional history by that threshold amount. Based on this assumption, feature generator 132 can examine user transaction data to identify transactions that potentially indicate that a user has previously obtained a lending product from another lender. In another example, feature generator 132 can assume that the payee identified in transaction descriptor data (i.e., the recipient of an outgoing disbursement of funds from the user's accounts) is a lender based on identifying periodic disbursements to the same payee, and, based on the identity of the payee, determine that the user has obtained a similar lending product from another source.

The n-tuple generated by feature generator 132 to represent a specific user may be correlated with clickstream data for targeted offers previously presented to that user. The clickstream data may include information identifying the targeted offers previously presented to the user and information indicating whether the user interacted with each targeted offer. User interaction with the targeted offer may be represented by the Boolean value TRUE in the n-tuple generated for the user and stored in training data repository 160, while user non-interaction with the targeted offer or an affirmative dismissal of the targeted offer may be represented by the Boolean value FALSE. In some embodiments, the user clickstream data may be reduced to a percentage of targeted offers that the user interacted with. In other embodiments, the user clickstream data may be reduced to a Boolean value indicative of whether the user interacted with at least one targeted offer.

Placement engine trainer 134 obtains the training data committed to training data repository 160 to train a predictive model that generates predictive scores indicative of a likelihood that a user will interact with a targeted offer. In some embodiments, the predictive model may be a random forest model that uses the associations between a user n-tuple and user clickstream data to generate an algorithm that weighs various features in each n-tuple to generate the predictive scores. In some embodiments, the predictive model may be trained using a first subset of the training data in training data repository 160, and the resulting trained predictive model may be tested against a second subset of the training data in the training data repository to verify that the predictive model can generate predictive scores that correspond to whether users in the second subset of the training data actually interacted with the targeted offer. After placement engine trainer 134 has trained the predictive model, placement engine trainer 134 may deploy the trained model to offer placement engine 144 for use in determining whether to present targeted offers to users of application 142, as discussed in further detail below.

In some embodiments, placement engine trainer 134 can periodically execute the training process described herein on updated data stored in training data repository 160. As discussed in further detail below, training data repository 160 may be periodically updated to include data for users who have been presented the targeted offer and clickstream data associated with the targeted offer. By periodically re-training the predictive model using updated data in training data repository 160, the predictive model can be periodically refined to generate predictive scores that more accurately predict whether a user is likely to interact with a future targeted offer.

Application server 140 generally includes an application 142 and an offer placement engine 144. Application 142 may be any type of application in which advertisements may be presented to a user of the application. While an accounting application has been used as an example of application 142, it should be recognized that application 142 is not limited to the accounting context and that the techniques described herein may be applied to the presentation of targeted offers in a variety of applications.

Generally, client device 120 may instantiate or initiate an instance of a session of application 142 in response to a request for application content received from client device 120. In some embodiments, the instance of a session of application 142 may be instantiated by a user accessing a home page of an application 142 structured as a web application. In other embodiments, an application interface 122 may instantiate the instance of application 142 by launching an executable file on client device 120 including native components that execute locally on client device 120 and use data provided by application 142. In some embodiments, when a session of application 142 is instantiated (e.g., after a user logs into application 142), application 142 may request that offer placement engine 144 determines whether to present a targeted offer to the user. In other embodiments, accessing particular portions of application 142 may cause application 142 to request offer placement engine 144 to determine whether to present a targeted offer to the user. Using an accounting application as an example, accessing a transactional history portion of the application 142 or a portion of the application 142 summarizing the user's data may prompt a determination of whether to present a targeted offer to the user.

Offer placement engine 144 generally uses the predictive model generated by placement engine trainer 134, as discussed above, to examine user data associated with the current user of the session of application 142 and to determine whether to present the targeted offer to the current user. To generate an input representative of the user for the predictive model, offer placement engine 144 generates an n-tuple representative of the current user based on the current user's application data. As discussed above, this data may include, without limitation, user transaction history, the age of the user account, information about whether the user has previously obtained products similar to that of the targeted offer, whether the user has granted access to the user data to other users (e.g., to outside service providers), and so on. To generate the n-tuple for the current user, offer placement engine 144 can parse through the transactional history of the current user to identify values for the predictive attributes to be included in the n-tuple. For example, as discussed above, where offer placement engine 144 is used to present targeted offers for a lending product to qualified users who may be interested in obtaining a lending product, the representative n-tuple may include data points identifying a number of negative occurrences in the user transaction history (e.g., overdrafts, bank fees, etc.), an age of a user account, a Boolean value indicating whether a user has previously obtained similar products, a Boolean value indicating whether the user has granted access to the user's data to outside service providers, and so on.

After offer placement engine 144 generates the n-tuple for the current user, offer placement engine 144 inputs the n-tuple into the trained predictive model (trained by prediction training system 130 and deployed to offer placement engine 144, as discussed above) to obtain a predictive score representing a likelihood that the current user will interact with the targeted offer. If offer placement engine 144 determines that the predictive score is less than a threshold score, offer placement engine 144 can indicate to application 142 that the targeted offer is not to be displayed to the current user, and application 142 may proceed to display the requested portion of the application to the current user. In some embodiments, if offer placement engine 144 determines that the targeted offer is not to displayed to the current user, offer placement engine 144 can attempt to identify other offers for presentation to the current user using the trained predictive model, as discussed above. If, however, offer placement engine 144 determines that the predictive score matches or exceeds the threshold value, offer placement engine 144 can determine that the targeted offer should be displayed to the current user. In some embodiments, offer placement engine 144 can display an interstitial page to the current user. This interstitial page may include, for example, audiovisual information to be played to the current user, along with links or buttons that the current user can use to skip the targeted offer or interact with the targeted offer (e.g., view more information about the targeted offer). In some embodiments, offer placement engine 144 can return control to application 142 with information identifying the targeted offer to be displayed to the current user in a dedicated advertising panel in application 142.

In some embodiments, offer placement engine 144 may monitor clickstream data associated with the current user to identify whether the current user has interacted with the targeted offer, declined to interact with the targeted offer, or otherwise rejected the targeted offer. Based on the user interaction, offer placement engine 144 can update training data repository 160 with additional information that placement engine trainer 134 can use to refine the predictive model deployed to offer placement engine 144. If the current user clicks on the targeted offer or otherwise affirmatively takes action to view details about the targeted offer, offer placement engine 144 can commit the n-tuple representative of the current user and an indication that the user interacted with the targeted offer to training data repository 160. If, however, the current user dismisses the targeted offer or takes no action between presentation of the targeted offer and receiving the requested portion of the application, offer placement engine 144 can commit the n-tuple representative of the current user and an indication that the user did not interact with the targeted offer to training data repository 160.

In some embodiments, offer placement engine 144 may examine user data to determine whether the current user is in a class of users who are candidates for receiving the targeted offer before calculating a predictive score and determining whether to present the targeted offer to the user based on the predictive score. Using the accounting application as an example, users can be divided into a number of groups or classes based on a likelihood that a user will apply for a loan and a likelihood a user will be approved for a loan. In some embodiments, threshold values may be established for the different values used to determine whether the current user is in the class of users who are candidates for receiving the targeted offer.

For example, threshold values may be established for an age of a user account, a number of specific events, and so on.

If the age of the current user's account exceeds the threshold age and the current user has fewer than the threshold number of specific events (e.g., where the specific events are negative events, such as late payment fees or the like), offer placement engine 144 may identify the user as a candidate for receiving the targeted offer and thus may determine whether to present the targeted offer to the current user based on a predictive score. Otherwise, if the user does not meet both criteria, offer placement engine 144 may prompt application 142 to display the requested portion of the application without calculating a predictive score for the current user.

In some embodiments, offer placement engine 144 may use information about whether the targeted offer was presented to the current user to determine whether to present the targeted offer again to the current user. The previous presentation information may include a date on which the targeted offer was previously presented to the current user. If the current user received the targeted offer but declined to interact with the targeted offer (e.g., rejected the offer) more than a threshold amount of time before the current date, offer placement engine 144 may present the targeted offer to the user again. If, however, the threshold amount of time has not elapsed from the last presentation of the targeted offer, the current user may receive the requested portion of the application without receiving the targeted offer.

In some embodiments, offer placement engine 144 may use information about whether the current user failed to receive the targeted offer to determine whether to present the targeted offer again to the current user. Information about the current user's failure to receive the targeted offer generally may be received from the party offering the targeted offer and indicate that, for any number of reasons, the current user applied for the product or service identified in the offer and that the party offering the targeted offer declined to actually provide the product or service to the current user. Offer placement engine 144 can compare the n-tuple of predictive values for the current user at the time the targeted offer was first presented to the current user to the n-tuple of predictive values for the current user at the present time to determine if a material change has occurred in the current user's data. A material change, in some embodiments, may be a change that affects the likelihood that the current user will qualify for the targeted offer. A material change may be defined, for example, as a change that exceeds a threshold value in one or more predictive values for the current user. For example, over a given time period, a material change may include a reduction in the number of negative events exceeding a threshold percentage, the age of the user account increasing by a threshold percentage, and so on. If offer placement engine 144 determines that the current user's data (and thus, the current user's likelihood to apply and qualify for the targeted offer) has materially changed, offer placement engine 144 can present the targeted offer to the user again.

While prediction training system 130, application server 140, user data repository 150, and training data repository 160 are illustrated as separate components in FIG. 1, it should be recognized by one of ordinary skill in the art that prediction training system 130, application server 140, user data repository 150, and training data repository 160 may be implemented on any number of computing systems, either as one or more standalone systems or in a distributed environment.

Example Computer-Implemented Method

Figure 2:
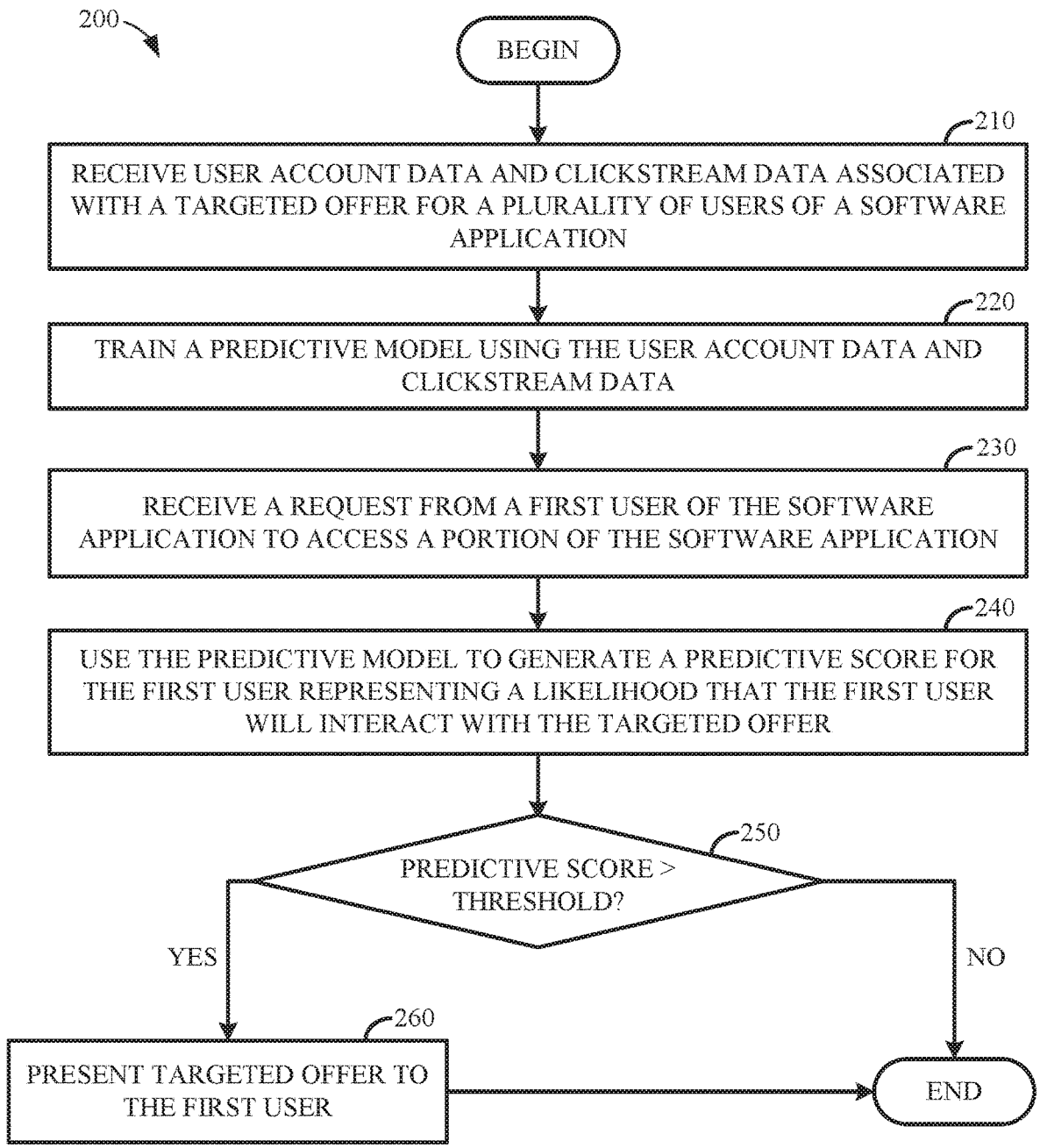
FIG. 2 illustrates example operations for training a predictive model, based on user account data, that generates a predictive score for a user representative of a likelihood that a user will interact with a targeted offer, according to an embodiment of the present disclosure.

FIG. 2 illustrates example operations 200 for training a predictive model for generating predictive scores indicative of a likelihood that a user will interact with a targeted offer and using the predictive score to determine whether to present a targeted offer to the user of the software application.

As illustrated, operations 200 begin at block 210, where a system receives user account data and clickstream data associated with a targeted offer for a plurality of users of the software application. As discussed above, the user account data may include user transactional history and other user attributes that are or can be reduced to predictive values indicative of whether the user will interact with a targeted offer. The clickstream data, as discussed, may include a history of the user having been presented with similar targeted offers in the past and whether the user interacted with (e.g., clicked on) those targeted offers.

At block 220, the system trains a predictive model using the user account data and the clickstream data. The training of the predictive model is discussed in further detail below with respect to FIG. 3. In some embodiments, the predictive model may be a random forest predictive model.

At block 230, the system receives a request from a first user of the software application to access a portion of the software application. As discussed, this request may include a request to instantiate a session of the application (e.g., after the first user has logged into the application) or a request by the first user to view a specific portion of the software application.

At block 240, the system uses the predictive model to generate a predictive score for the first user. The predictive score generally represents a likelihood that the first user will interact with the targeted offer.

As discussed above, in some embodiments, to generate a predictive score for the first user, the system generates an n-tuple including the predictive values calculated for the first user from the first user's data. For example, where user data includes transactional data to be examined to generate a predictive value corresponding to a number of specific events, the system can examine the first user's transactional data to identify specific events and increment a counter of specific events. These specific events may be identified, for example, based on negative ending balances, matching 3-tuples of {transaction date, transaction description, transaction amount}, or other criteria. For predictive values that are represented in an n-tuple by a Boolean value, the system can generate the predictive value by examining the user data for one or more matching criteria, and, if any matching criteria are found, the predictive value may be represented by Boolean TRUE in the n-tuple.

At block 250, the system examines the predictive score to determine whether the predictive score exceeds a threshold value. If the predictive score exceeds the threshold value, at block 260, the system presents the targeted offer to the first user. As discussed, the system can present the targeted offer to the first user as an interstitial page prior to displaying the requested portion of the application to the first user, in a dedicated advertising panel in the requested portion of the application, as an electronic communication, and so on. Otherwise, operations 200 terminate.

While FIG. 2 illustrates an initial training of a predictive model and initial use of the predictive model to determine whether to present a targeted offer to the user of the software application, it should be recognized that the predictive model need not be trained each time a determination is to be made of whether to present a targeted offer to the user of the software application. After the predictive model is trained, blocks 230-260 described below may be executed to use a previously-trained predictive model to determine whether to present a targeted offer to a user of the software application.

Figure 3:
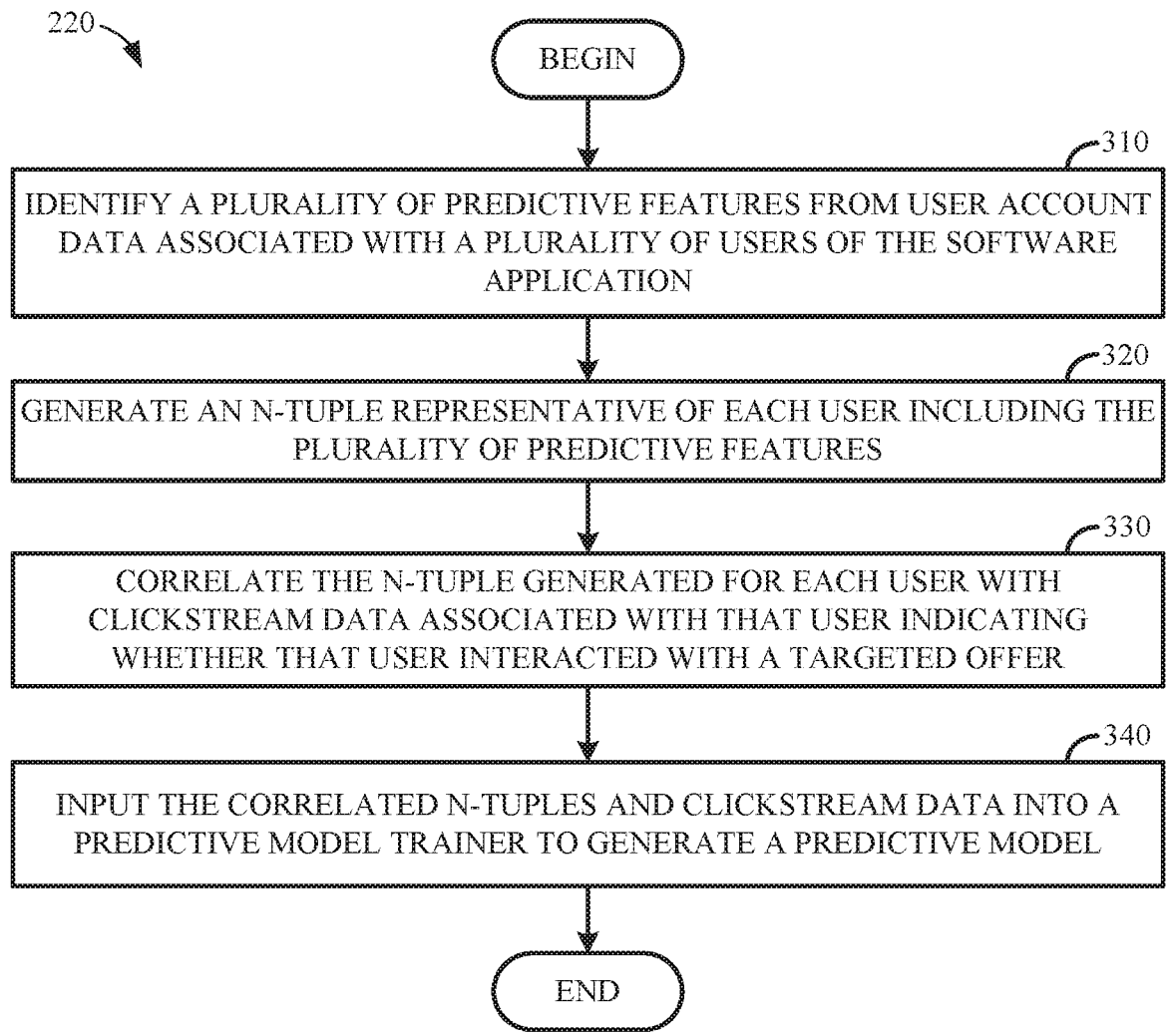
FIG. 3 illustrates example operations for delivering targeted offers to a user of a software application using a predictive score, according to an embodiment of the present disclosure.

FIG. 3 illustrates example operations 220 for training a predictive model for generating predictive scores indicative of a likelihood that a user will interact with a targeted offer.

As illustrated, operations 220 begin at block 310, where the system identifies a plurality of predictive features from user account data associated with a plurality of users of the software application. As discussed, for each user, the plurality of predictive features may be generated by parsing, filtering, or otherwise processing user account data and transactional history data to reduce user data for a particular user into a set of predictive values. Using the accounting application as an example, the user account data may include information about the age of the user account and whether the user has granted access to the user account to other users (i.e., to an external service provider). User account data that may entail additional processing to generate a value for a predictive feature may include, for example, a number of specific events (or specific activity) in user transactional history data and whether the user has obtained similar products in the past, as discussed above with respect to the parsing of user transactional history data to identify specific product purchases or other transactions indicative of a user having obtained specific goods or services.

At block 320, the system generates an n-tuple (or feature vector) representative of each user for which the system obtained data from user a data repository (e.g. user data repository 150 in FIG. 1). As discussed, the n-tuple may include values calculated for each of the features in discussed with respect to block 310.

At block 330, the system correlates the n-tuple of predictive feature values generated for each of the users with clickstream data associated with each user. In some embodiments, the clickstream data may be represented as a Boolean value indicating whether the user has previously interacted with a similar targeted offer. In some embodiments, the clickstream data may be represented as a ratio of the number of targeted offers presented to the user to the number of targeted offers that the user interacted with to obtain more information and/or attempt to obtain the product or service advertised in the targeted offer.

At block 340, the correlated n-tuples and clickstream data are input into a predictive model trainer to generate a predictive model. The trained predictive model is deployed to offer placement engine 144 and used by offer placement engine 144 to determine whether to present a targeted offer to a user. In some embodiments, the predictive model may be a random forest model that uses decision trees, created from the correlated n-tuples and clickstream data, to generate predictive scores indicative of a likelihood that a user will interact with a targeted offer.

Example User Features

FIG. 4 illustrates an example decomposition of user account data and clickstream data into an n-tuple associated with clickstream data for use in training a predictive model that generates predictive scores indicative of whether a user will interact with a targeted offer.

As illustrated, user account data 410 may include various pieces of information associated with a particular user. In this particular example, the user with the user ID of "1234" has an account activation date of Jan. 3, 2017 and has granted users with the user IDs of 1235, 1236, and 1238 access to the account. The user additionally has a number of transactions in the transaction history table with transaction IDs of 1234_01 through 1234_05.

Based on user account data 410, a feature generator (e.g., feature generator 132 of prediction training system 130) can generate an n-tuple representing the user account data illustrated as the set of data in user n-tuple 430. As illustrated, the set of data includes an account age, an indication of whether the user has granted account access to other users, a number of specific events (here, transactions resulting in a negative balance) in the user's transaction history, and an indication of whether the user has previously obtained similar products as that advertised in the targeted offer. In this example, the user account has an age of 490 days, has binary value of 1 indicating that the user has granted account access to other users (i.e., Boolean TRUE), a value of 2 for the number of specific events in the user's transaction history (transactions 1234_01 and 1234_04, which resulted in a negative ending balance), and a binary value of 0 indicating that the user has not obtained a similar product.

Clickstream data 420 represents a history of the user's interaction with similar targeted offers. As illustrated, a system can maintain a history of targeted offers presented to the user and an indication, for each targeted offer, of whether the user interacted with the targeted offer. In this example, user 1234 has been presented with three offers: offers 101, 102, and 103. Of these offers, user 1234 has interacted with (i.e., affirmatively requested additional information about an offer) offers 102 and 103 and declined to interact with offer 101. The clickstream data can be reduced to a value representing the user's history of interacting with targeted offers. For example, as illustrated in user n-tuple 430, the n-tuple generated from user account data 410 may be associated with a ratio of the number of offers the user interacted with to the number of offers presented to the user (in this case, 0.67, or the user has interacted with ⅔ of the offers presented to the user). In some embodiments, the n-tuple generated from user account data 410 may be associated with a Boolean value instead of a ratio of offers the user interacted with to offers presented to the user. In such a case, the value generated from clickstream data may be Boolean TRUE if the user interacted with at least one of the targeted offers and may be Boolean FALSE if the user interacted with none of the targeted offers previously presented to the user.

Example System

Figure 5:
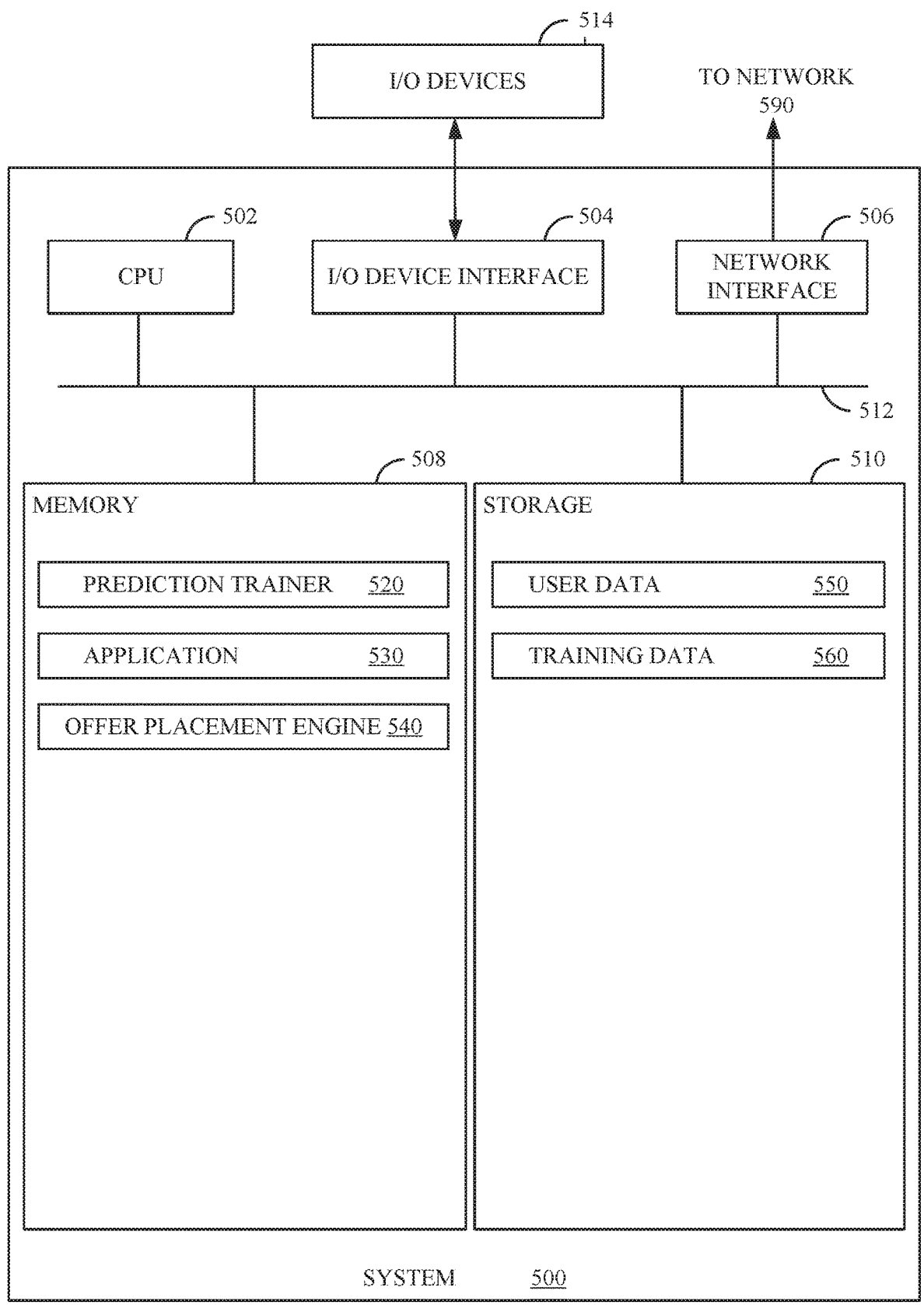
FIG. 5 depicts an example computing system with which embodiments of the present disclosure may be implemented.

FIG. 5 illustrates an example system 500 for intelligently presenting targeted offers to users of a software application, according to embodiments of the present disclosure. For example, system 500 may be representative of prediction training system 130 and application server 140 in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory.

Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a prediction trainer 520, an application 530, and an offer placement engine 540. While prediction trainer 520, application 530, and offer placement engine 540 are illustrated as separate components in FIG. 5, it should be recognized by one of ordinary skill in the art that the functionality of prediction trainer 520, application 530, and offer placement engine 540 may be implemented in one or more functional modules loaded into memory 508 for execution by CPU 502. Prediction trainer 520 generally generates training data 560 from user data 550 and uses the generated training data to train and deploy a predictive model used by offer placement engine 540 to determine whether to present a targeted offer to a user of application 530. As discussed, prediction trainer 520 can generate training data 560 by generating n-tuples (or feature vectors) from user data including a plurality of values for attributes that are predictive, alone or in combination, of whether a user will interact with a targeted offer. The generated n-tuples may be associated with clickstream data representative of user interaction with similar targeted offers, and the correlations between n-tuples of user data and clickstream data for similar targeted offers may be used to train the predictive model.

Application 530 generally allows for a user to instantiate a session of the application to perform one or more functions exposed by the application. While application 530 is executing, application 530 may request that offer placement engine 540 determine whether to present a targeted offer to a user of application 530. In response, offer placement engine 540 can examine user data associated with the user of the application session in order to calculate a predictive score and use the predictive score to determine whether to present the targeted offer to the user. As discussed, in some embodiments, offer placement engine 540 may examine user data to determine if the user is a member of a class of users who are candidates to receive the targeted offer. If the user is a member of the class of candidate users, offer placement engine 540 can generate an n-tuple with values corresponding to the predictive attributes from the user data and input the generated n-tuple into the predictive model generated by prediction trainer 520 to obtain a predictive score for the user. If the predictive score exceeds a threshold score for presenting targeted offers to the user of the application 530, offer placement engine 540 can take one or more actions to present the targeted offer to the user (e.g., in an interstitial page, a dedicated advertisement panel in application 530, an electronic communication, etc.). Otherwise, offer placement engine 540 can pass control back to application 530 to load and display a requested portion of the application without presenting the targeted offer to the user.

Storage 510 comprises user data 550 and training data 560. As discussed above, user data 550 may include user attribute data and transactional data for each user of a software application. The user attribute data may include information that can be reduced to one or more predictive values included in an n-tuple representative of the user, such as an age of the user's account, whether the user has granted account access to other users (i.e., external service providers), and so on. The user data 550 also includes user transactional data that can be parsed to identify specific events, or specific activity, in the user data. Training data 560 includes a plurality of n-tuples generated from user data, associated with clickstream data representing a user's history of previous interaction with similar targeted offers. Over time, training data 560 may be augmented as users are presented targeted offers and interact (or decline to interact) with the targeted offer, and the updated data can be used to re-train predictive models used to generate predictive scores indicative of whether a user is likely to interact with the targeted offer.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for presenting a targeted offer to a user of a software application, comprising:
  receiving a request from a user of the software application to access a portion of the software application;
  generating an input vector representing the user of the software application based on data stored by the software application for the user, wherein the input vector includes at least an age of an account associated with the user, an indication of whether the user has granted other users access to the account, and a number of specified events in a transaction history associated with the user over a first time window;
  using a predictive model to generate a first predictive score for the user representing a likelihood that the user will interact with the targeted offer based on data stored by the software application for the user, wherein:

the predictive model comprises a model trained using user account data reduced into n-tuples representative of a plurality of users and clickstream data, the n-tuples including a plurality of identified predictive attributes from the user account data for each user of the plurality of users, the n-tuples generated for each user of the plurality of users having been correlated with clickstream data associated with that user, and the clickstream data associated with that user indicating whether that user interacted with the targeted offer;

presenting the targeted offer to the user based, at least in part, on determining that the first predictive score for the user exceeds a threshold score;

determining whether to use network resources to re-present the targeted offer to the user by:

receiving, from a computing system associated with the targeted offer, an indication that the user requested the targeted offer and did not receive the targeted offer;

receiving a subsequent request from the user of the software application to access the portion of the software application;

generating an updated input vector representing the user of the software application, wherein the update input vector includes an updated age of the account associated with the user, an indication of whether the user has granted other users access to the account, and a number of specified events in the transaction history associated with the user over a second time window;

determining that the input vector has changed by a threshold amount based on a comparison between the input vector and the updated input vector; wherein the determination that the input vector has changed by a threshold amount comprises one or more of a determination that the age of the account has increased by a first threshold percentage or a determination that the number of specified events in the transaction history over the second time window has decreased by a second threshold percentage with respect to the number of specified events in the transaction history over the first time window;

determining that the targeted offer is eligible for re-presentation to the user based, at least in part on the determination that the input vector has changed by the threshold amount and a determination that a threshold amount of time has elapsed between the request and the subsequent request;

based on the determination that the targeted offer is eligible for re-presentation to the user, using a predictive model to generate a second predictive score for the user representing a likelihood that the user will interact with the targeted offer based on the updated input vector; and re-presenting the targeted offer to the user based, at least in part, on determining that the second predictive score for the user exceeds the threshold score.

2. The method of claim 1, wherein presenting the targeted offer to the user is further based on a previous history of the user interacting with the targeted offer.

3. The method of claim 2, wherein:
the previous history of the user indicates that the user rejected the targeted offer, and determining that the targeted offer is eligible for re-presentation to the user is further based on determining that a threshold period of time has elapsed since the user rejected the targeted offer.

4. The method of claim 2, wherein:
the previous history of the user indicates that the user interacted with the targeted offer and that user interaction with the targeted offer resulted in a failure to obtain the targeted offer, and determining that the targeted offer is eligible for re-presentation to the user is further based on determining that user data associated with the user has materially changed since the user interacted with the targeted offer.

5. The method of claim 1, wherein the request to access a portion of the software application comprises a request to initiate a new session of the software application.

6. The method of claim 1, wherein the request to access a portion of the software application comprises a request to view transactional data of the user in the software application.

7. The method of claim 1, wherein presenting the targeted offer to the user comprises presenting the targeted offer in an interstitial page prior to displaying the requested portion of the software application.

8. The method of claim 1, wherein presenting the targeted offer to the user comprises presenting the targeted offer in a dedicated advertising section of the software application.

9. The method of claim 1, wherein the plurality of identified predictive attributes comprises one or more of:
a number of occurrences of a specific activity in user transactional activity, an age of a user account in the software application, a history of a user having interacted with and obtained similar offers, and whether a user has granted account access to an external service provider.

10. The method of claim 1, wherein the predictive model comprises a random forest model.

11. A system for presenting a targeted offer to a user of a software application, comprising:
a processor configured to:
receive a request from a user of the software application to access a portion of the software application, generate an input vector representing the user of the software application based on data stored by the software application for the user, wherein the input vector includes at least an age of an account associated with the user, an indication of whether the user has granted other users access to the account, and a number of specified events in a transaction history associated with the user over a first time window, use a predictive model to generate a first predictive score for the user representing a likelihood that the user will interact with the targeted offer based on data stored by the software application for the user, wherein:

the predictive model comprises a model trained using user account data reduced into n-tuples representative of a plurality of users and clickstream data, the n-tuples including a plurality of identified predictive attributes from the user account data for each user of the plurality of users, the n-tuples generated for each user of the plurality of users having been correlated with clickstream data associated with that user, and the clickstream data associated with that user indicating whether that user interacted with the targeted offer,
present the targeted offer to the user based, at least in part, on determining that the first predictive score for the user exceeds a threshold score,
determine whether to use network resources to re-present the targeted offer to the user by:
receiving, from a computing system associated with the targeted offer, an indication that the user requested the targeted offer and did not receive the targeted offer,
receiving a subsequent request from the user of the software application to access the portion of the software application,
generating an updated input vector representing the user of the software application, wherein the update input vector includes an updated age of the account associated with the user, an indication of whether the user has granted other users access to the account, and a number of specified events in the transaction history associated with the user over a second time window,
determining that the input vector has changed by a threshold amount based on a comparison between the input vector and the updated input vector; wherein the determination that the input vector has changed by a threshold amount comprises one or more of a determination that the age of the account has increased by a first threshold percentage or a determination that the number of specified events in the transaction history over the second time window has decreased by a second threshold percentage with respect to the number of specified events in the transaction history over the first time window:
determine that the targeted offer is eligible for re-presentation to the user based, at least in part, on the determination that the input vector has changed by the threshold amount and a determination that a threshold amount of time has elapsed between the request and the subsequent request,
based on the determination that the targeted offer is eligible for re-presentation to the user, using a predictive model to generate a second predictive score for the user representing a likelihood that the user will interact with the targeted offer based on the updated input vector, and
re-presenting the targeted offer to the user based, at least in part, on determining that the second predictive score for the user exceeds the threshold score; and
a memory.

12. The system of claim 11, wherein the targeted offer is presented to the user further based on a previous history of the user interacting with the targeted offer.

13. The system of claim 12, wherein:
the previous history of the user indicates that the user rejected the targeted offer, and
determining that the targeted offer is eligible for re-presentation to the user is further based on determining that a threshold period of time has elapsed since the user rejected the targeted offer.

14. The system of claim 12, wherein:
the previous history of the user indicates that the user interacted with the targeted offer and that user interaction with the targeted offer resulted in a failure to obtain the targeted offer, and
determining that the targeted offer is eligible for re-presentation to the user is presented to the user further based on determining that user data associated with the user has materially changed since the user interacted with the targeted offer.

15. The system of claim 11, wherein the request to access a portion of the software application comprises one of:
a request to initiate a new session of the software application, or
a request to view transactional data of the user in the software application.

16. The system of claim 11, wherein the processor is configured to present the targeted offer to the user by one of:
presenting the targeted offer in an interstitial page prior to displaying the requested portion of the software application, or
presenting the targeted offer in a dedicated advertising section of the software application.

17. The system of claim 11, wherein the plurality of identified predictive attributes comprises one or more of:
a number of occurrences of a specific activity in user transactional activity,
an age of a user account in the software application,
a history of a user having interacted with and obtained similar offers, and
whether a user has granted account access to an external service provider.

18. The system of claim 11, wherein the predictive model comprises a random forest model.

19. A system for presenting a targeted offer to a user of a software application, comprising:
a placement engine trainer configured to:
receive at least user account data and clickstream data associated with a targeted offer for a plurality of users of the software application;
train a predictive model using the user account data and clickstream data, wherein training the predictive model comprises:
identifying a plurality of predictive attributes from the user account data associated with each user of the plurality of users,
generating an n-tuple representative of each user of the plurality of users including each of the plurality of predictive attributes, and
correlating the n-tuple representative of each user of the plurality of users with clickstream data associated with that user, wherein the clickstream data associated with that user indicates whether that user interacted with the targeted offer; and
a targeted offer placement engine configured to:
receive a request from a user of the software application to access a portion of the software application,
generate an input vector representing the user of the software application based on data stored by the software application for the user, wherein the input vector includes at least an age of an account associated with the user, an indication of whether the user has granted other users access to the account, and a number of specified events in a transaction history associated with the user over a first time window,
use the predictive model to generate a first predictive score for the user representing a likelihood that the user will interact with the targeted offer based on data stored by the software application for the user, present the targeted offer to the user based, at least in part, on determining that the first predictive score for the user exceeds a threshold score, determine whether to use network resources to re-present the targeted offer to the user by:

receiving, from a computing system associated with the targeted offer, an indication that the user requested the targeted offer and did not receive the targeted offer, receiving a subsequent request from the user of the software application to access the portion of the software application, generating an updated input vector representing the user of the software application, wherein the update input vector includes an updated age of the account associated with the user, an indication of whether the user has granted other users access to the account, and a number of specified events in the transaction history associated with the user over a second time window, determining that the input vector has changed by a threshold amount based on a comparison between the input vector and the updated input vector wherein the determination that the input vector has changed by a threshold amount comprises one or more of a determination that the age of the account has increased by a first threshold percentage or a determination that the number of specified events in the transaction history over the second time window has decreased by a second threshold percentage with respect to the number of specified events in the transaction history over the first time window;

determining that the targeted offer is eligible for re-presentation to the user based, at least in part, on the determination that the input vector has changed by the threshold amount and a determination that a threshold amount of time has elapsed between the request and the subsequent request, based on the determination that the targeted offer is eligible for re-presentation to the user, using a predictive model to generate a second predictive score for the user representing a likelihood that the user will interact with the targeted offer based on the updated input vector, and re-presenting the targeted offer to the user based, at least in part, on determining that the second predictive score for the user exceeds the threshold score.

20. The system of claim 19, wherein the predictive model comprises a random forest model.

* * * * *